(12) United States Patent
Chen

(10) Patent No.: US 8,319,100 B2
(45) Date of Patent: Nov. 27, 2012

(54) ELECTRONIC DEVICE ENCLOSURE

(75) Inventor: Yun-Lung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 253 days.

(21) Appl. No.: 12/879,372

(22) Filed: Sep. 10, 2010

(65) Prior Publication Data

US 2011/0290519 A1   Dec. 1, 2011

(30) Foreign Application Priority Data

May 31, 2010   (CN) .......................... 2010 1 0187342

(51) Int. Cl.
 *H05K 5/00* (2006.01)
(52) U.S. Cl. ..................... 174/50; 174/520; 361/679.02; 361/726; 312/223.2
(58) Field of Classification Search ............... 174/50, 174/521, 520, 53, 57, 58, 17 R, 66, 67; 361/683, 361/724, 730, 752, 796, 679.32, 726, 679.02, 361/679.01; 312/223.1, 223.2, 223.3; 220/3.2, 220/3.8, 4.02
See application file for complete search history.

(56) References Cited

U.S. PATENT DOCUMENTS

| | | | |
|---|---|---|---|
| 6,288,336 B1 * | 9/2001 | Chen ............................... | 174/50 |
| 6,555,747 B2 * | 4/2003 | Chen et al. .................. | 312/223.2 |
| 6,637,847 B2 * | 10/2003 | Crisp et al. .................. | 312/223.2 |
| 7,131,711 B2 * | 11/2006 | Chen .......................... | 312/223.2 |
| 7,164,080 B2 * | 1/2007 | Chen et al. ....................... | 174/50 |
| 7,166,799 B2 * | 1/2007 | Chen et al. ....................... | 174/50 |
| 7,253,360 B2 * | 8/2007 | Chen et al. ....................... | 174/50 |
| 7,642,453 B2 * | 1/2010 | Cheng et al. ................... | 174/50 |

* cited by examiner

*Primary Examiner* — Angel R Estrada
(74) *Attorney, Agent, or Firm* — Altis Law Group, Inc.

(57) ABSTRACT

An electronic device enclosure includes an enclosure body, a bezel and a connecting assembly. The enclosure body includes a front panel. The front panel includes metal. The bezel includes bamboo and covers the front panel. The connecting assembly includes a fastener and a retaining clip engaged with the fastener. The fastener is fastened to the bezel and the retaining clip is clasped in the front panel.

14 Claims, 5 Drawing Sheets

ELECTRONIC DEVICE ENCLOSURE

BACKGROUND

1. Technical Field

The present disclosure relates to electronic device enclosures, especially to a computer enclosure.

2. Description of Related Art

A typical computer enclosure includes a case and a bezel mounted to the case. The case includes a top panel, bottom panel and side panels. The case is usually made of metal and the bezel is made of plastic. The plastic bezel is manufactured by die assembly methods. The bezel is mounted to a computer case by means of a number of set screws screwed into the bezel directly with a screw driver. However, the die assembly may be changed to accommodate new type of bezel when a different type of computer enclosure is needed. It is inconvenient to use a screw driver when assembling or disassembling the bezel and it is a waste to produce a new die assembly to manufacture different type of bezel.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
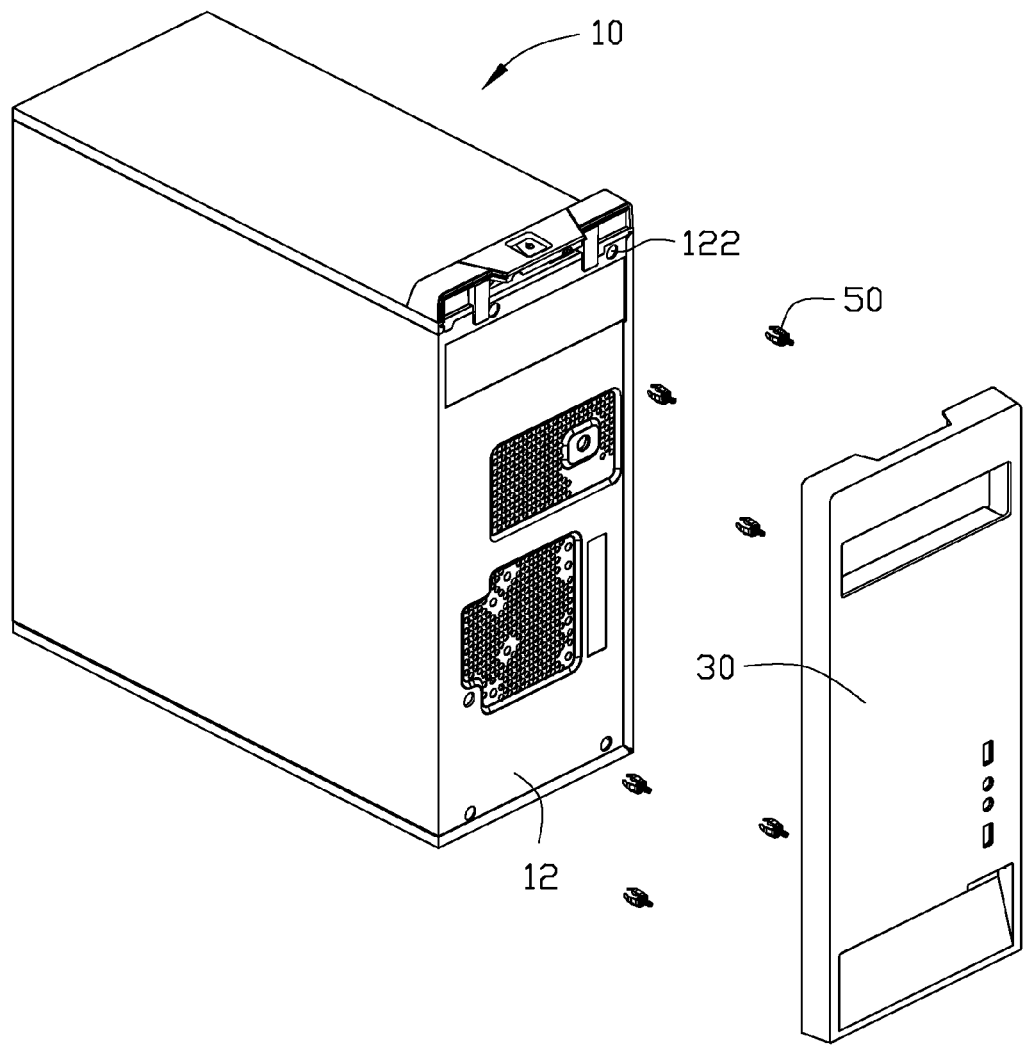
FIG. 1 is an exploded, isometric view of an embodiment of an electronic device enclosure.
Figure 2:
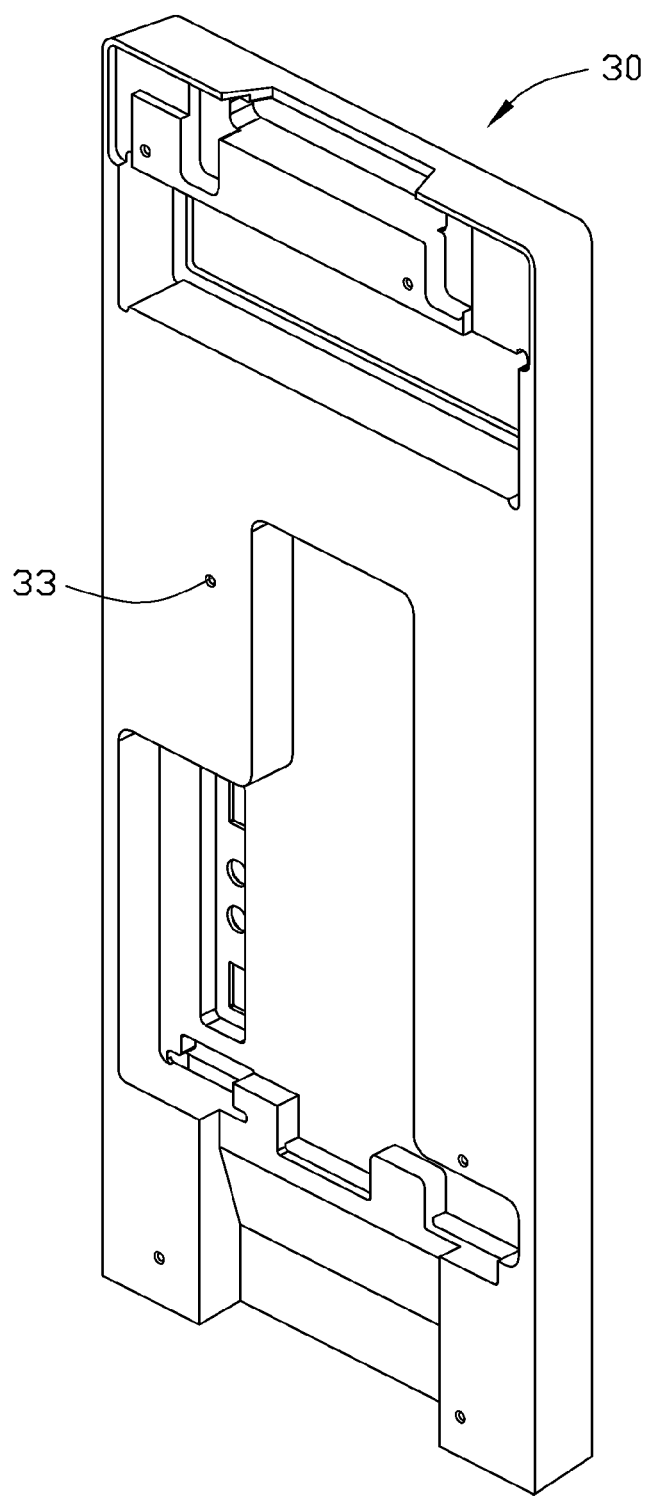
FIG. 2 is an enlarged view of a bezel of FIG. 1, but the bezel is shown from another aspect.

Referring to FIG. 1 and FIG. 2, one embodiment of an electronic device enclosure includes an enclosure body 10, a bezel 30, and a number of connecting assemblies 50 for mounting the bezel 30 to the enclosure body 10.

The enclosure body 10 is a cube, and includes a metal front panel 12. A retaining hole 122 is defined in the front panel 12.

The bezel 30 is made of bamboo. A number of screw holes 33 are defined in an inner side of the bezel 30.

Figure 3:
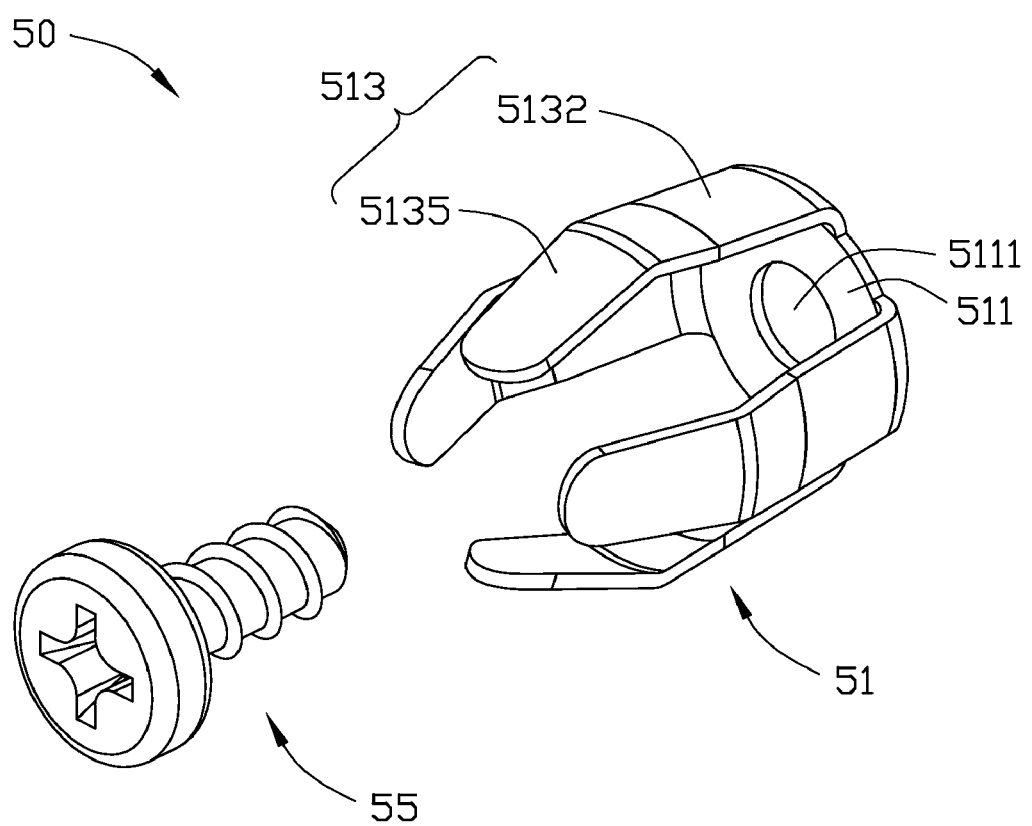
FIG. 3 is an exploded, isometric view of a connecting assembly of FIG. 1.

Referring to FIG. 3, each connecting assembly 50 includes a fastener 55 and a retaining clip 51. The retaining clip 51 includes a mounting portion 511, and four claws 513 extending from the mounting portion 511. A mounting hole 5111 is defined in the mounting portion 511 for receiving the fastener 55. The four claws 513 are evenly spaced, and each claw 513 includes an elastic holding portion 5132 and a guiding portion 5135 at a distal end of each claw 513. The holding portion 5132 is oblique to the mounting portion 511 at an original state. The guiding portion 5135 is oblique to the elastic holding portion 5132.

In one embodiment, the fastener 55 is a screw with a head portion and a threaded post.

Figure 4:
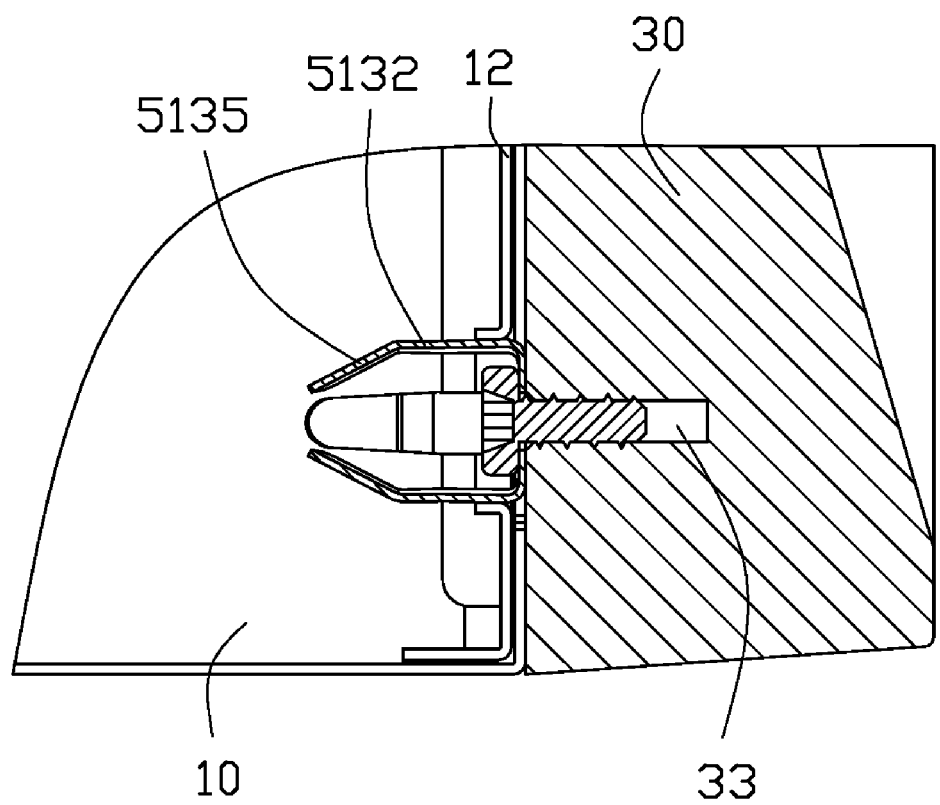
FIG. 4 is a partial, assembled and cross-sectional view of an embodiment of the electronic device enclosure.
Figure 5:
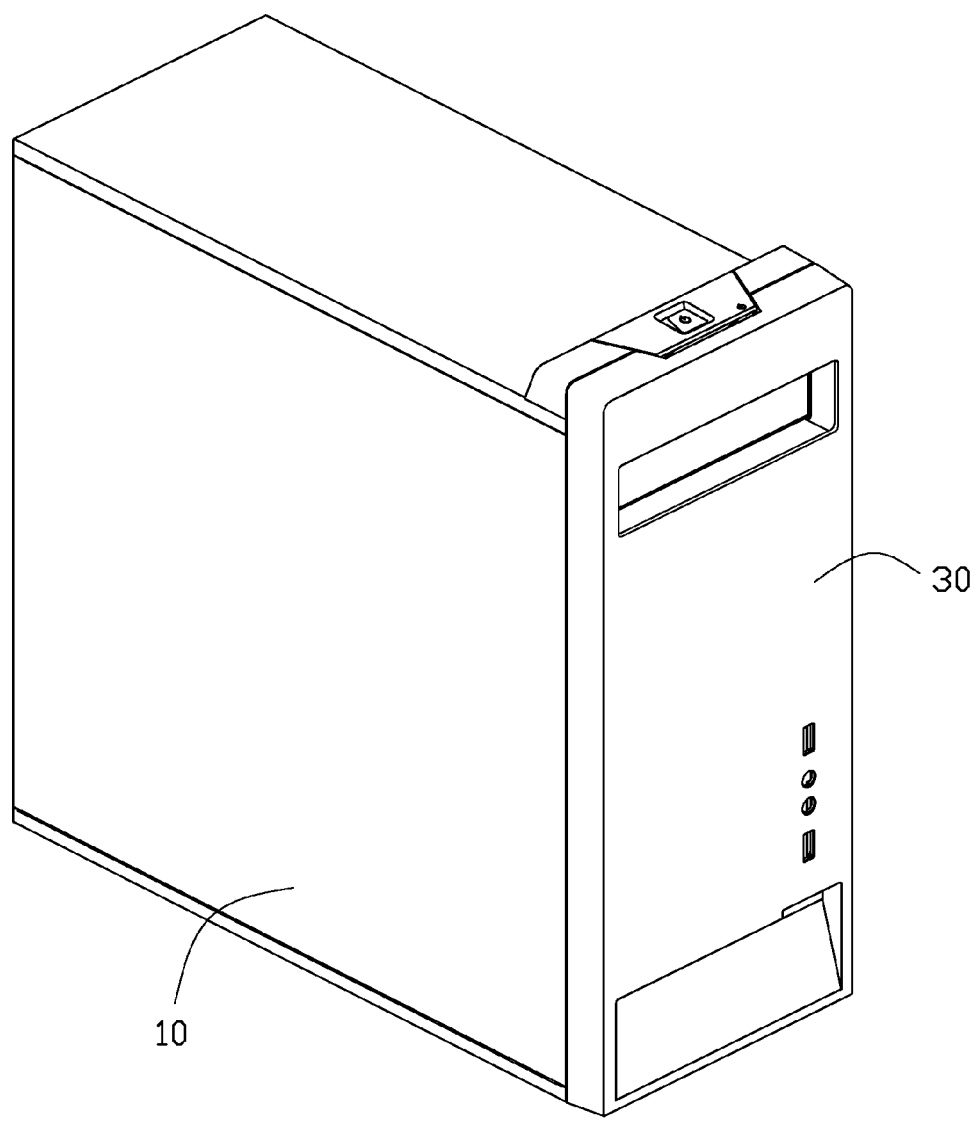
FIG. 5 is an assembled view of FIG. 1.

Referring to FIG. 4 and FIG. 5, during attaching the bezel 30 to the enclosure body 10, each fastener 55 extends through the mounting hole 5111 of the retaining clip 51 and screws into the screw hole 33 of the bezel 30. The retaining clips 51 are retained to the bezel 30 with the fasteners 55. The bezel 30 is aligned with the front panel 12 of the enclosure body 10 with each retaining clip 51 corresponding to each retaining hole 122 of the front panel 12. The bezel 30 is moved towards the front panel 12. The distal end of the guiding portions 5135 extend into the retaining holes 122, and the guiding portions 5135 abuts the front panel 12. The holding portions 5132 are elastically distorted and are engaged with the front panel 12 in the retaining holes 122. The bezel 30 is mounted to the front panel 12.

During disassembling the bezel 30 from the enclosure body 10, the bezel 30 is pulled away from the front panel 12. The retaining clips 51 are drawn out of the retaining holes 122, and the elastic holding portions 5132 are released and spring back out. The bezel 30 is disassembled from the enclosure body 10.

In other embodiments, each retaining clip 51 can include at least two claws 513 to engage with the front panel 12.

The bezel 30 is made of bamboo. Bamboo is the fastest-growing woody plant and is used extensively in everyday life as building material and as a highly versatile raw product. Bamboo is also easy to manufacture. Bamboo is environmental friendly material and can be manufactured into different shapes in similar ways, such as cutting and surfacing.

The bezel 30 is also easy to assemble, when the fasteners 55 are mounted to the bezel 30, the bezel 30 can be directly fixed to the enclosure body 10 by pushing the bezel 30 towards the front panel 12. The bezel 30 can be unfixed from the enclosure body 10 by pulling the bezel 30 away from the front panel 12 without using a screw driver.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
   an enclosure body, the enclosure body comprising a front panel, wherein the front panel comprises metal;
   a bezel covering the front panel, the bezel comprising bamboo; and
   a connecting assembly comprising a fastener and a retaining clip engaged with the fastener, wherein the fastener is fastened to the bezel and the retaining clip is clasped in the front panel;
   wherein the retaining clip comprises at least two claws, and a retaining hole is defined in the front panel; the at least two claws are received in the retaining hole; and each of the at least two claws comprises an elastic holding portion and a guiding portion at a distal end of each of the at least two claws; and the guiding portion is oblique to the elastic holding portion.

2. The electronic device enclosure of claim 1, wherein the retaining clip comprises a mounting portion; a mounting hole is defined in the mounting portion, and the fastener extends through the mounting hole and retains the mounting portion to the bezel.

3. The electronic device enclosure of claim 1, wherein the at least two claws extend into the retaining hole, and the elastic holding portions of the at least two claws are elastically deformed by the front panel.

4. The electronic device enclosure of claim 1, wherein each guiding portion has an arcuate end edge.

5. The electronic device enclosure of claim 1, wherein the fastener is a screw.

6. An electronic device enclosure comprising:
   an enclosure body, the enclosure body comprising a front panel, wherein the front panel comprises metal;
   a bezel covering the front panel, a retaining hole defined in the front panel, and the bezel comprising bamboo; and
   a connecting assembly comprising a fastener and a retaining clip engaged with the fastener, the retaining clip comprising at least two claws engaged with the front panel in the retaining hole, the at least two claws being opposite to each other, wherein the fastener is fastened to the bezel to connect the bezel to the front panel;
   wherein each of the at least two claws comprises an elastic holding portion and a guiding portion at a distal end of each of the at least two claws, and the guiding portion is oblique to the elastic holding portion.

7. The electronic device enclosure of claim 6, wherein the retaining clip further comprises a mounting portion; a mounting hole is defined in the mounting portion, and the fastener extends through the mounting hole and retains the mounting portion to the bezel.

8. The electronic device enclosure of claim 6, wherein the at least two claws extend into the retaining hole, and the elastic holding portions of the at least two claws are elastically deformed by the front panel.

9. The electronic device enclosure of claim 6, wherein each guiding portion has an arcuate end edge.

10. The electronic device enclosure of claim 6, wherein the fastener is a screw.

11. An electronic device enclosure comprising:
    an enclosure body, the enclosure body comprising a front panel, wherein the front panel comprises metal;
    a bezel covering the front panel, a retaining hole defined in the front panel; and
    a connecting assembly comprising a retaining clip, the retaining clip comprising a mounting portion and at least two claws extending from the mounting portion; the mounting portion is configured to be mounted to the bezel; each claw comprising an elastic holding portion extending from the mounting portion; the elastic holding portion oblique to the mounting portion; and the at least two claws configured to be engaged with the front panel in the retaining hole to enable each holding portion to resist an edge of the retaining hole.

12. The electronic device enclosure of claim 11, wherein each claw further comprises a guiding portion extending from the holding portion; the guiding portion is oblique to the elastic holding portion; and the guiding portion of each claw is configured to guide the claw to move into the retaining hole.

13. The electronic device enclosure of claim 11, wherein the mounting portion defines a mounting hole; the bezel defines a screw hole corresponding to the mounting hole; and the connecting assembly further comprises a fastener to extend through the mounting hole and the screw hole to secure the retaining clip to the bezel.

14. The electronic device enclosure of claim 11, wherein the bezel comprises bamboo.

\* \* \* \* \*